(12) United States Patent
Ben David et al.

(10) Patent No.: US 12,498,015 B2
(45) Date of Patent: Dec. 16, 2025

(54) FLYWHEEL ASSEMBLY

(71) Applicant: ZOOZ POWER LTD., Lod (IL)

(72) Inventors: Ilan Ben David, Rosh Haayin (IL); Rotem Ezer, Ganei Tikva (IL)

(73) Assignee: ZOOZ POWER LTD., Lod (IL)

( * ) Notice: Subject to any disclaimer, the term of this patent is extended or adjusted under 35 U.S.C. 154(b) by 0 days.

(21) Appl. No.: 18/724,626

(22) PCT Filed: Dec. 26, 2022

(86) PCT No.: PCT/IL2022/051386
§ 371 (c)(1),
(2) Date: Jun. 27, 2024

(87) PCT Pub. No.: WO2023/126923
PCT Pub. Date: Jul. 6, 2023

(65) Prior Publication Data
US 2025/0067253 A1    Feb. 27, 2025

(30) Foreign Application Priority Data

Dec. 27, 2021    (IL) .......................................... 289441

(51) Int. Cl.
*F16F 15/30*    (2006.01)
*F16F 15/315*   (2006.01)
*H02K 7/02*     (2006.01)

(52) U.S. Cl.
CPC .......... *F16F 15/30* (2013.01); *F16F 15/3153* (2013.01); *H02K 7/025* (2013.01); *Y02E 60/16* (2013.01)

(58) Field of Classification Search
CPC ........ F16F 15/30; F16F 15/3153; H02K 7/02; H02K 7/025; F03G 3/08; Y02E 60/16; F16C 2361/55
See application file for complete search history.

(56) References Cited

U.S. PATENT DOCUMENTS

| | | | |
|---|---|---|---|
| 4,186,245 A | 1/1980 | Gilman | |
| 4,286,475 A * | 9/1981 | Friedericy | F16F 15/305 74/572.12 |
| 4,458,400 A * | 7/1984 | Friedericy | F16C 15/00 29/894 |
| 4,481,840 A * | 11/1984 | Friedericy | F16F 15/305 428/192 |
| 4,538,079 A | 8/1985 | Nakayama | |
| 5,586,471 A | 12/1996 | Nardone | |

(Continued)

FOREIGN PATENT DOCUMENTS

| CN | 106051045 A | 10/2016 |
|---|---|---|
| CN | 106438840 A | 2/2017 |

(Continued)

*Primary Examiner* — Adam D Rogers
(74) *Attorney, Agent, or Firm* — Webb & Co., Ltd.

(57) ABSTRACT

A flywheel assembly constituted of: a plurality of stacked plates, a first end plate of the plurality of plates defining a first end of a rotor and a second end plate of the plurality of plates defining a second end of the rotor; and a pair of shafts, each extending from a respective one of the first end and the second end of the rotor along a rotational axis of the rotor, wherein a perimeter of each of the first and second end plates exhibits a respective plurality of teeth.

14 Claims, 3 Drawing Sheets

(56) References Cited

U.S. PATENT DOCUMENTS

| | | | |
|---|---|---|---|
| 5,932,935 A | 8/1999 | Clifton | |
| 7,267,028 B2 * | 9/2007 | Gabrys | F16F 15/3153 |
| | | | 74/572.11 |
| 11,293,517 B2 * | 4/2022 | Pullen | B60L 50/30 |
| 11,674,560 B2 * | 6/2023 | Pullen | F16F 15/315 |
| | | | 74/572.11 |
| 11,824,355 B2 * | 11/2023 | Walkingshaw | H02J 15/007 |
| 12,163,567 B2 * | 12/2024 | Pullen | F16F 15/30 |
| 12,331,729 B2 * | 6/2025 | Gaiser | H02K 7/02 |
| 2010/0083790 A1 | 4/2010 | Graney | |
| 2011/0031827 A1 * | 2/2011 | Gennesseaux | H02K 7/025 |
| | | | 310/74 |
| 2013/0152728 A1 | 6/2013 | Gottfried | |
| 2014/0165778 A1 | 6/2014 | Andrews | |
| 2014/0260780 A1 * | 9/2014 | Simons | F16F 15/305 |
| | | | 74/572.12 |
| 2014/0366683 A1 | 12/2014 | Pullen | |
| 2020/0259379 A1 * | 8/2020 | Sanders | H02K 7/025 |
| 2023/0213023 A1 * | 7/2023 | Gaiser | B32B 15/18 |
| | | | 74/572.12 |
| 2023/0246481 A1 * | 8/2023 | Walkingshaw | H02K 7/003 |
| | | | 700/295 |
| 2024/0384708 A1 * | 11/2024 | Walkingshaw | F16C 17/02 |
| 2024/0384776 A1 * | 11/2024 | Walkingshaw | F16F 15/3156 |
| 2024/0388164 A1 * | 11/2024 | Walkingshaw | F16F 15/3153 |
| 2024/0388165 A1 * | 11/2024 | Walkingshaw | F16F 15/30 |
| 2025/0163994 A1 * | 5/2025 | Pullen | F16B 35/005 |
| 2025/0172125 A1 * | 5/2025 | Pullen | F03G 3/08 |
| 2025/0172126 A1 * | 5/2025 | Pullen | F16F 15/3153 |

FOREIGN PATENT DOCUMENTS

| | | | | |
|---|---|---|---|---|
| CN | 217328348 U * | 8/2022 | | |
| DE | 4025354 A1 | 4/1991 | | |
| DE | 102013208856 A1 * | 11/2014 | | H02K 1/246 |
| EP | 0611229 A1 | 8/1994 | | |
| WO | 2013130642 A1 | 9/2013 | | |
| WO | WO-2014119422 A1 * | 8/2014 | | H02K 1/30 |
| WO | WO-2020167864 A2 * | 8/2020 | | F16F 15/30 |
| WO | WO-2023161638 A1 * | 8/2023 | | F16B 33/004 |
| WO | WO-2024180152 A1 * | 9/2024 | | F16C 15/00 |

* cited by examiner

FLYWHEEL ASSEMBLY

CROSS-REFERENCE TO RELATED APPLICATIONS

This application claims priority from Israeli patent application S/N 289441, filed Dec. 27, 2021, and entitled "FLYWHEEL ASSEMBLY".

TECHNICAL FIELD

The present disclosure relates substantially to the field of energy storage, and more particularly to a flywheel assembly.

BACKGROUND

A flywheel can be rotated to mechanically store energy and then release the energy when desired, for example, by generating electric power with an electric generator coupled to the flywheel. In order to operate properly, the flywheel needs to be balanced, otherwise high-speed rotations can cause the flywheel to break.

SUMMARY

Accordingly, it is a principal object of the present invention to overcome at least some of the disadvantages of prior art flywheel assemblies by providing a flywheel assembly comprising: a plurality of stacked plates, a first end plate of the plurality of plates defining a first end of a rotor and a second end plate of the plurality of plates defining a second end of the rotor; and a pair of shafts, each extending from a respective one of the first end and the second end of the rotor along a rotational axis of the rotor, wherein a perimeter of each of the first and second end plates exhibits a respective plurality of teeth.

In some examples, for each of the first and second end plates, each of the respective plurality of teeth exhibits a respective hole. In some examples, each of the first and second end plates exhibits an outer face and an inner face opposing the outer face, the inner face of the first end plate facing the inner face of the second end plate, and wherein, for each of the first and second end plates, the respective holes extend from the respective outer face into the respective one of the first and second end plates.

In some examples, the flywheel assembly further comprises a pair of securing members, each of the pair of securing members secured to the outer face of a respective one of the first and second end plates, wherein each of the pair of shafts is secured to a respective one of the pair of securing members.

In some examples, for each of the first and second end plates, the volume of each of the respective holes is defined such that a center of mass of the flywheel assembly lies on the rotational axis extending through the pair of shafts.

In some examples, the plurality of stacked plates comprises a first stack of end plates, a second stack of end plates and a plurality of stacks of intermediate plates stacked between the first and second stacks of end plates, wherein the first stack of end plates comprises the first end plate and the second stack of end plates comprises the second end plate, and wherein a perimeter of each plate of the first and second stack of end plates comprises a respective plurality of teeth, each tooth of each plate of the first stack of end plates aligned with a respective tooth of each of the remainder of plates of the first stack of end plates and each tooth of each plate of the second stack of end plates aligned with a respective tooth of each of the remainder of plates of the second stack of end plates.

In some examples, one or more of the holes of the first end plate extends through more than one of the first stack of end plates and/or one or more of the holes of the second end plate extends through more than one of the second stack of end plates.

In some examples, the rotation axis is a symmetry axis. In some examples, for each of the first and second end plates, each of the respective plurality of teeth do not extend past a circumference of each of the plurality of stacked plates.

In some examples, each of the plurality of stacked plates are circular, wherein the radii of the plurality of stacked plates are equal to each other. In some examples, the flywheel assembly further comprises a filler material, a respective predetermined amount of the filler material being deposited between each adjacent pair of the plurality of stacked plates.

In some examples, each respective predetermined amount of the filler material is defined such that the respective pair of adjacent plates are parallel to each other. In some examples, the filler material is an adhesive material.

In some examples, the flywheel assembly further comprises a plurality of rods, wherein the rotor comprises a plurality of channels, each channel extending through the plurality of stacked plates from the first end of the rotor to the second end of the rotor, and wherein each of the plurality of rods is inserted within a respective one of the plurality of channels.

In one independent example, a method for manufacturing a flywheel assembly is provided, the method comprising: for each of a plurality of stacks of plates, applying a respective predetermined amount of adhesive filler material between each pair of adjacent plates; for each of the plurality of stacks of plates, securing the respective stack of plates between two parallel reference plates; stacking the plurality of stacks of plates to define a rotor; securing the stacked stacks of plates to each other; and securing each of a pair of shafts to a respective end of the rotor.

In some examples, the plurality of stacks of plates comprises a first stack of end plates, a second stack of end plates and a plurality of stacks of intermediate plates stacked between the first and second stacks of end plates, wherein each of the first stack of end plates comprises a plurality of teeth in a perimeter thereof, each tooth of each plate of the first stack of end plates aligned with a respective tooth of each of the remainder of plates of the first stack of end plates, wherein each of the second stack of end plates comprises a plurality of teeth in a perimeter thereof, each tooth of each plate of the second stack of end plates aligned with a respective tooth of each of the remainder of plates of the second stack of end plates, wherein each tooth of at least one of the first stack of end plates comprises a respective hole therein and each tooth of at least one of the second stack of end plates comprises a respective hole therein, and wherein the method further comprises: determining a position of a center of mass of the flywheel assembly; and responsive to the determined position, expanding one or more of the plurality of holes such that the center of mass of the flywheel assembly lies on a rotational axis extending through the pair of shafts.

In some examples, the method further comprises: after solidification of the filler material, creating a plurality of channels in each of the plurality of stacks of plates; and inserting a plurality of rods through the created channels of the plurality of stacks of plates, the securing the stacked stacks of plates to each other being responsive to the inserted rods.

Additional features and advantages of the invention will become apparent from the following drawings and description.

Unless otherwise defined, all technical and scientific terms used herein have the same meaning as commonly understood by one of ordinary skill in the art to which this invention pertains. In case of conflict, the patent specification, including definitions, governs. As used herein, the articles "a" and "an" mean "at least one" or "one or more" unless the context clearly dictates otherwise. As utilized herein, "and/or" means any one or more of the items in the list joined by "and/or". As an example, "x and/or y" means any element of the three-element stack $\{(x), (y), (x, y)\}$. In other words, "x and/or y" means "x, y or both of x and y". As some examples, "x, y, and/or z" means any element of the seven-element stack $\{(x), (y), (z), (x, y), (x, z), (y, z), (x, y, z)\}$.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of examples of the instant inventive concepts. This is done merely for convenience and to give a general sense of the inventive concepts, and "a" and "an" are intended to include one or at least one and the singular also includes the plural unless it is obvious that it is meant otherwise.

As used herein, the term "about", when referring to a measurable value such as an amount, a temporal duration, and the like, is meant to encompass variations of +/−10%, more preferably +/−5%, even more preferably +/−1%, and still more preferably +/−0.1% from the specified value, as such variations are appropriate to perform the disclosed devices and/or methods.

The following examples and aspects thereof are described and illustrated in conjunction with systems, tools and methods which are meant to be exemplary and illustrative, but not limiting in scope. In various examples, one or more of the above-described problems have been reduced or eliminated, while other examples are directed to other advantages or improvements.

BRIEF DESCRIPTION OF DRAWINGS

For a better understanding of the invention and to show how the same may be carried into effect, reference will now be made, purely by way of example, to the accompanying drawings in which like numerals designate corresponding sections or elements throughout.

With specific reference now to the drawings in detail, it is stressed that the particulars shown are by way of example and for purposes of illustrative discussion of the preferred examples of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how several forms of the invention may be embodied in practice. In the accompanying drawings.

DETAILED DESCRIPTION OF CERTAIN EXAMPLES

Figure 1A:
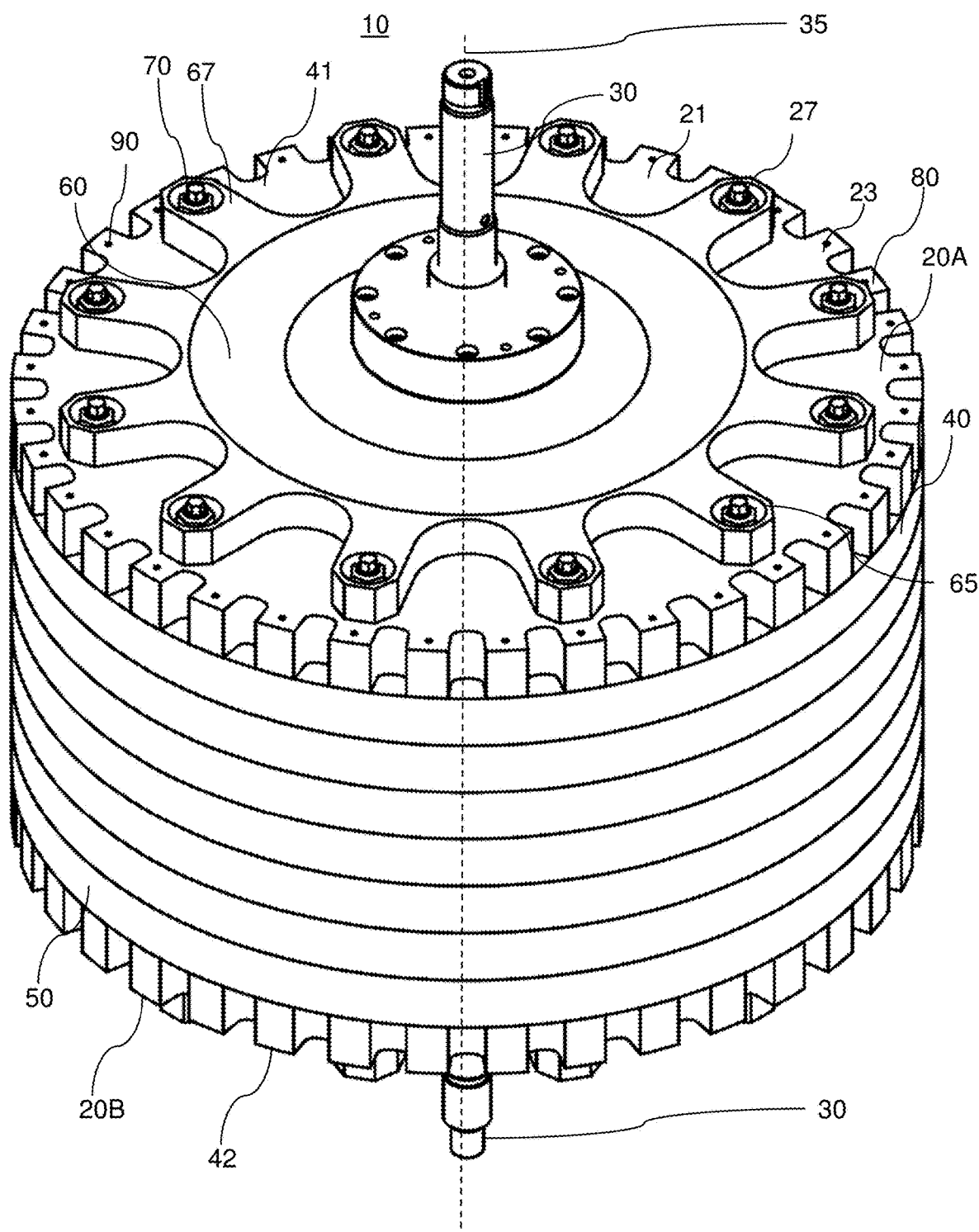
FIGS. 1A-1C illustrate high-level perspective views of various parts of a flywheel assembly, in accordance with some examples.

In the following description, various aspects of the disclosure will be described. For the purpose of explanation, specific configurations and details are stack forth in order to provide a thorough understanding of the different aspects of the disclosure. However, it will also be apparent to one skilled in the art that the disclosure may be practiced without specific details being presented herein. Furthermore, well-known features may be omitted or simplified in order not to obscure the disclosure. In the figures, like reference numerals refer to like parts throughout. In order to avoid undue clutter from having too many reference numbers and lead lines on a particular drawing, some components will be introduced via one or more drawings and not explicitly identified in every subsequent drawing that contains that component.

FIG. 1A illustrates a high-level perspective view of a flywheel assembly 10. Flywheel assembly 10 comprises: a plurality of stacked plates 20, each exhibiting an outer face 21, an inner face 22 and a perimeter 23; and a pair of shafts 30. In some examples, each plate 20 comprises a plurality of holes 25, each hole 25 extending from outer face 21 to inner face 22. In such an example, holes 25 of each plate 20 are aligned with holes 25 of each adjacent plate 20 to form a plurality of channels 27. The term "channel", as used herein, means a passageway and is not limited to any particular shape and size. Stacked plates 20 define a rotor 40, extending from a first end 41 to second end 42. In some examples, a first end plate 20, denoted 20A, defines first end 41 of rotor 40 and a second end plate 20, denoted 20B, defines second end 41 of rotor 40.

In some examples, flywheel assembly 10 further comprises a filler material 45. A respective predetermined amount of filler material 45 is deposited between each adjacent pair of plates 20. In one further example, each respective predetermined amount of filler material 45 is defined such that the respective pair of adjacent plates 20 are parallel to each other. Particularly, outer faces 21 and inner faces 22 of plates 20 are not necessarily completely straight, which can cause plates 20 to not be completely parallel to each other. Typically, there is generally a deviation of 1-2% in the thickness of each plate 20. This may cause an imbalance in flywheel assembly 10. For example, in the case of a plate 20 exhibiting a thickness of 3 mm, there can be a deviation of 0.03-0.06 mm between outer face 21 of each plate 20 and inner face 22 of the adjacent plate 20. If rotor 40 comprises 100 plates, to get a 300 mm rotor height, an overall deviation error from balance can be calculated as:

$$e = SQRT(100) * 0.06 = 0.6 \, \text{mm} \qquad \text{EQ. 1}$$

which is a serious deviation error that will cause a significant imbalance during rotation. Thus, using filler material 45 allows constructing flywheel assembly 10 from stacked plates 20, while maintaining balance thereof. Particularly, keeping plates 20 parallel to each other will align shafts 30 along rotational axis 35.

Filler material 45 pushes out the respective plates 20 such that they are parallel to each other. Additionally, due to the non-straight faces, spaces can be formed between adjacent plates 20, which can cause plates 20 to move and generate imbalances in flywheel assembly 10. Filler material 45 fills in those spaces between adjacent plates 20. In some examples, filler material 45 is an adhesive material, such as glue.

The term "outer face", as used herein, means a face of the respective plate 20 facing away from a center point of rotor 40, the center point defined along a length of rotor 40 measured from first end 41 to second end 42. The term "inner face", as used herein, means a face of the respective plate 20 facing the center point of rotor 40.

In some examples, each plate 20 is circular shaped. In some examples, the thickness of each plate 20, i.e. the distance between outer face 21 and inner face 22, is about 3 mm. The term "perimeter", as used herein, means an area of the respective plate 20 that surrounds the respective plate 20 and is distanced from the center of the respective plate 20. For example, if plate 20 is circular shaped, the perimeter is an outer ring of the circle. In one further example, the radii of plates 20 are equal to each other. The term "shaft", as used herein, is not meant to be limited to any particular configuration or shape.

Figure 1B:
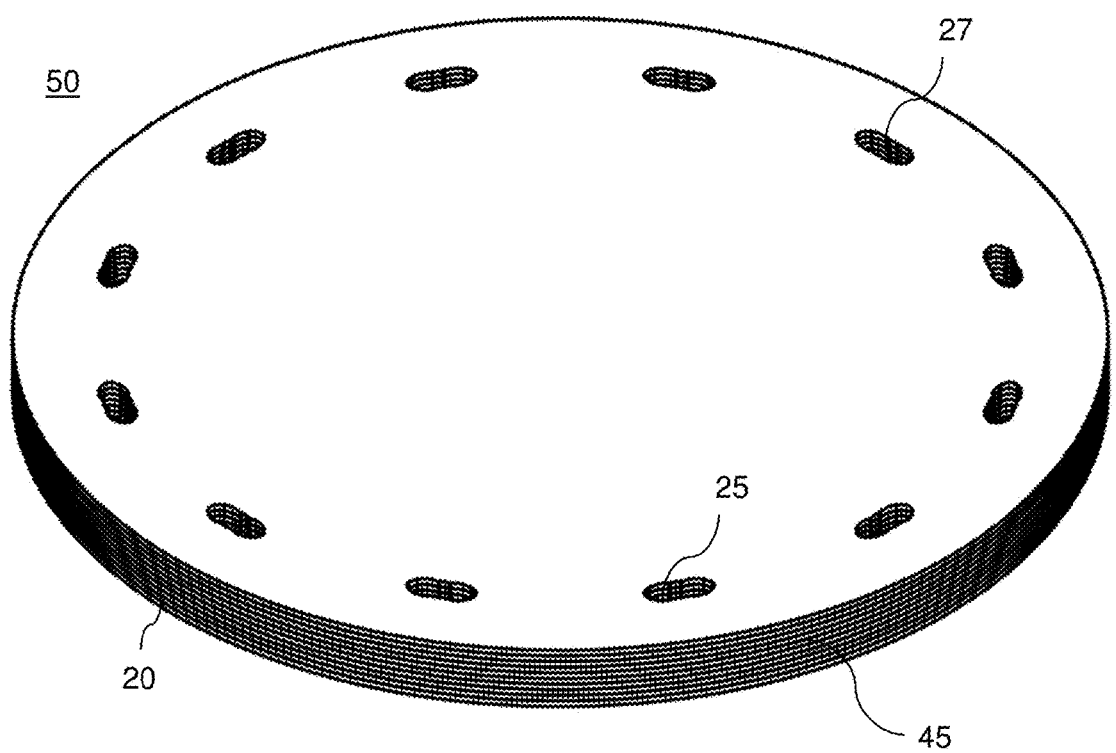
Figure 1C:
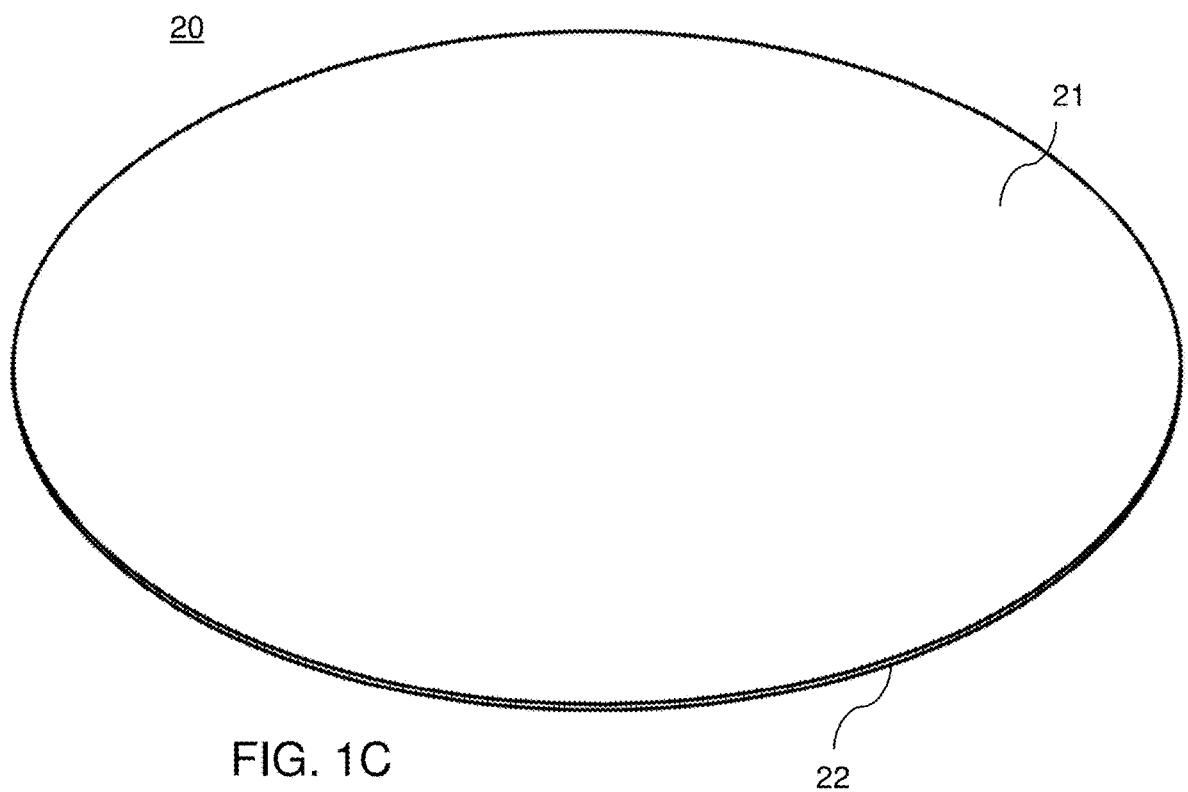

In some examples, stacked plates 20 comprise a plurality of stacks 50 of stacked plates 20. FIG. 1B illustrates a high-level perspective view of an example of a stack 50 of stacked plates 20, and FIG. 1C illustrates a high-level perspective view of an example a single plate 20. Although FIG. 1C illustrates plate 20 without holes 25, this is not meant to be limiting in any way. In such an example, end plate 20A and end plate 20B each define one end of a respective stack 50 of end plates.

In some examples, flywheel assembly 10 further comprises a pair of securing members 60. In one further example, each securing member 60 comprises a plurality of holes 65. In such an example, holes 65 of each securing member 60 are aligned with holes 25 of the respective adjacent plate 20. In some examples, each securing member 60 exhibits a plurality of arms 67, each arm 67 extending towards a respective hole 25, and each hole 65 being positioned at the end of a respective arm 67. In some examples, flywheel assembly 10 further comprises a plurality of rods 70. The term "rod", as used herein, is meant to include any appropriate elongated shape.

Each shaft 30 extends from a respective one of first plate 20A and second plate 20B. In some examples, each securing member 60 faces outer face 21 of a respective one of first plate 20A and second plate 20B, and each shaft 30 is secured to a respective securing member 60 and extends therefrom. Shafts 30 extend along a rotational axis 35 of rotor 40. The term "rotational axis", as used herein, means an axis around which rotor 40 rotates. In some examples, rotational axis 35 of rotor 40 is a symmetry axis. The term "symmetry axis", as used herein, means that for each cross-section of rotor 40 that rotational axis 35 extends therealong is symmetrical, rotational axis 35 being the line of symmetry of the respective cross-section.

In some examples, each rod 70 extends through holes 25 of plates 20, from first end 41 to second end 42 of rotor 40, i.e. through channels 27, and through holes 65 of securing members 60. In some examples, each rod 70 is secured within a respective hole 65 by a respective screwing mechanism.

In some examples, perimeter 23 of first plate 20A exhibits a respective plurality of teeth 80. Similarly, in some examples, perimeter 23 of second plate 20B exhibits a respective plurality of teeth 80. The term "teeth", as used herein, means that the respective perimeter 23 exhibits a plurality of successive sections, each section exhibiting a respective empty section and a respective tooth 80. In some examples, teeth 80 do not extend past a circumference of a respective plate 20 adjacent thereto. In the example where plate 20A and plate 20B each define a respective end of a respective stack 50 of end plates 20, perimeter 23 of each plate 20 of each stack 50 of end plates 20 comprises a respective plurality of teeth 80. Each tooth 80 of each plate 20 of the first stack 50 of end plates 20 is aligned with a respective tooth 80 of each of the remainder of plates 20 of the first stack 50 of end plates 20. The term "remainder", as used herein, means all the other plates 20. Similarly, each tooth 80 of each plate 20 of the second stack 50 of end plates 20 is aligned with a respective tooth 80 of each of the remainder of plates 20 of the second stack 50 of end plates 20. The term "aligned", as used herein, means positioned one over the other such that aligned teeth 80 form a single tooth.

In some examples, each tooth 80 of first plate 20A and second plate 20B exhibits a respective hole 90 extending from the respective outer face 21 into the respective plate 20. In some examples, some of teeth 80 do not exhibit a respective hole 90. In some examples, where plate 20A and plate 20B define respective ends of stacks 50 of end plates 20, one or more holes 90 extend through teeth 80 of more than one end plate 20. In some examples, the volume of each hole 90 is defined such that a center of mass of flywheel assembly 10 lies on rotational axis 35, i.e. rotational axis 35 and the center of mass meet at the same point in 3-dimensional space. Thus, holes 90 are utilized to compensate for any irregularities of flywheel assembly 10 which cause the center of mass to not be at the centroid thereof. It is noted that the shape of each hole 90 may not be uniform and may exhibit a plurality of cross-sections of different shapes and/or diameters.

In operation, shafts 30 are secured to respective rotating assemblies (not shown) that allow flywheel assembly 10 to be rotated about rotational axis 35. Advantageously, because flywheel assembly 10 is formed of stacked plates 20, in case of applied forces causing structural damage to a plate 20, this does not cause the entire rotor 40 to break as can be the case in flywheel assemblies formed of a single rotatable unit. Further advantageously, flywheel assembly 10 is balanced, thereby providing efficient and safe rotation thereof.

Figure 2:
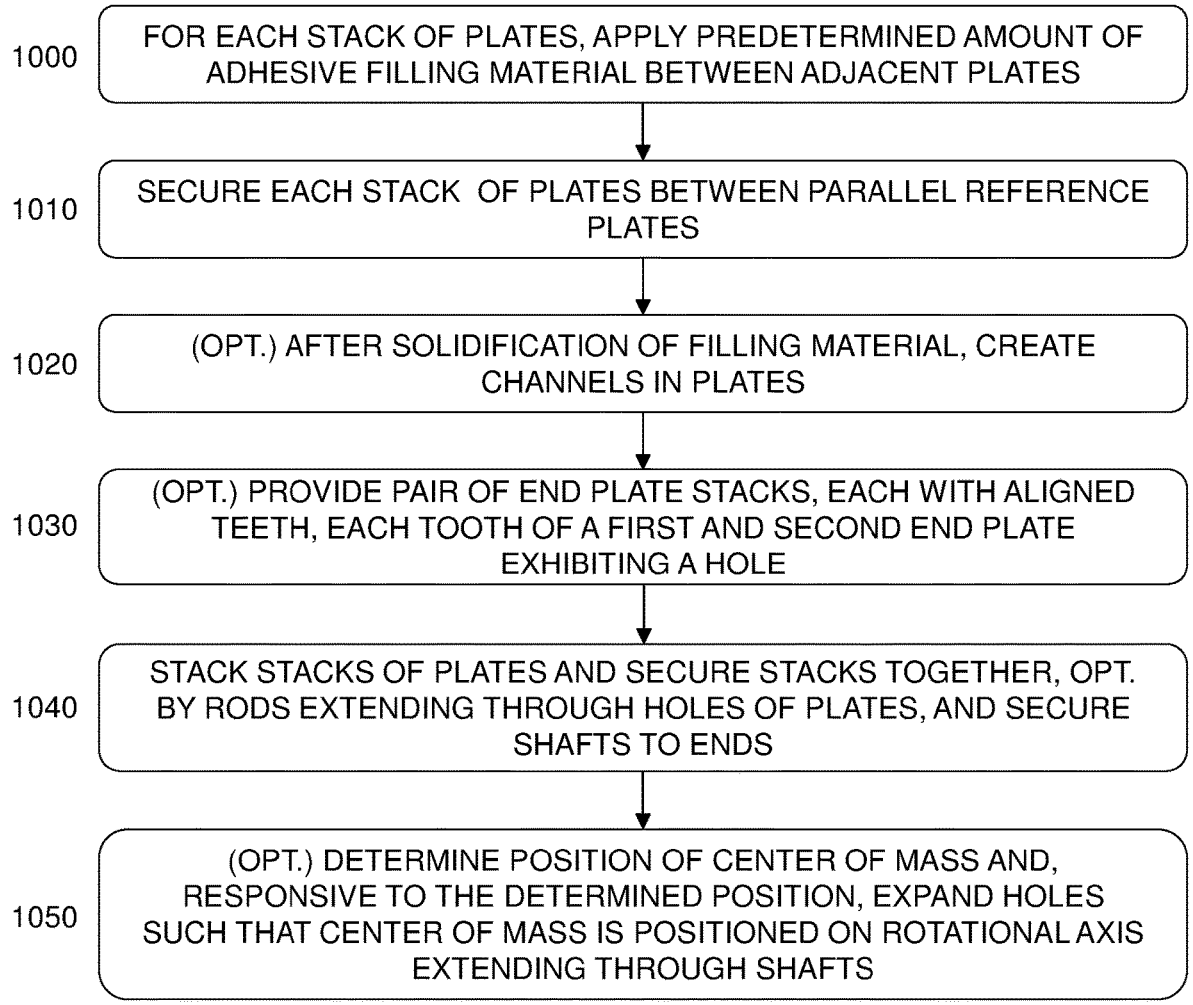
FIG. 2 illustrates a high-level flow chart of a method of manufacturing a flywheel assembly, in accordance with some examples.

FIG. 2 illustrates a high-level flow chart of a method of manufacturing a flywheel assembly, in accordance with some embodiments. In some examples, the method of FIG. 2 is for the manufacture of flywheel assembly 10, however this is not meant to be limiting in any way. In stage 1000, stacks of plates are selected and a respective predetermined amount of adhesive filler material is applied between each pair of adjacent plates.

In stage 1010, each stack of plates is secured in a jig between two parallel reference plates. The term "jig", as used herein, means any device configured to hold the stack of plates in a predetermined position. The two parallel plates are accurately measured plates, and accurately placed so that they are parallel to each other. The adhesive filler material solidifies, thereby maintaining a parallel relationship between the plates of the stack.

In optional stage 1020, after solidification of the adhesive filler material, channels are created in the stack of plates to allow rods to be inserted therethrough, as described above. In optional stage 1030, a pair of stacks of end plates are provided, each end plate exhibiting a plurality of teeth in a perimeter thereof. A hole is created in each tooth of at least one end plate of each stack of end plates. In some examples, the volumes of the holes are initially generally equal to each other.

In stage 1040, the different stacks of plates are stacked on each other and secured. Each stack of end plates is secured to a respective end of the stacked stacks of plates such that stacks of intermediate plates are stacked between the two stacks of end plates to define a rotor. The term "intermediate plates" are meant merely as a reference to the fact that the intermediate plates are between the stacks of end plates. In some examples, during the stacking of stage 1040, measurements are taken numerous times to improve the accuracy of the stacking.

Additionally, each a respective shaft is secured to the center of a respective end of the rotor. In some examples, the stacks of plates are secured by tie rods being inserted into the created holes of stage 1020. In some examples, the stacks of plates are further secured to each other by applying a respective predetermined amount of the adhesive filler material therebetween.

In optional stage 1050, the position of the center of mass of the constructed assembly of stage 1040 is determined. The position of the center of mass is determined using a balancing machine, as known to those skilled in the art. Responsive to the determined position of the center of mass not being situated on a rotational axis extending through the pair of shafts, one or more of the holes of the teeth are expanded accordingly to adjust the position of the center of mass until it lies on the rotational axis of the shafts. The term "expand", as used herein, means to increase the volume thereof. The volume of a hole can be increased by increasing the depth of the hole, i.e. how far it extends into the rotor, and/or by increasing the diameter/width thereof. It is noted that the diameter/width of a hole can be increased along only a portion of the length of the hole.

Although the above has been described in an example where flywheel assembly 10 comprises holes 90 and stacked plates 20 with filler material 45 therebetween, this is not meant to be limiting in any way. Particularly, in some examples, flywheel assembly 10 is provided without filler material 45 between plates 20 thereof. In some examples, flywheel assembly 10 is not formed of stacked plates 20, and rather is formed from a single cylindrical element. In some examples, holes 90 are not provided. In some examples, end plates 20A and 20B with teeth 80 are not provided.

It is appreciated that certain features of the invention, which are, for clarity, described in the context of separate examples, may also be provided in combination in a single example. Conversely, various features of the invention which are, for brevity, described in the context of a single example, may also be provided separately or in any suitable subcombination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description.

The invention claimed is:

1. A flywheel assembly comprising:
a plurality of stacked plates, a first end plate of the plurality of plates defining a first end of a rotor and a second end plate of the plurality of plates defining a second end of the rotor; and
a pair of shafts, each extending from a respective one of the first end and the second end of the rotor along a rotational axis of the rotor,
wherein a perimeter of each of the first and second end plates exhibits a respective plurality of teeth.

2. The flywheel assembly of claim 1, wherein, for each of the first and second end plates, each of the respective plurality of teeth exhibits a respective hole.

3. The flywheel assembly of claim 2, wherein each of the first and second end plates exhibits an outer face and an inner face opposing the outer face, the inner face of the first end plate facing the inner face of the second end plate, and
wherein, for each of the first and second end plates, the respective holes extend from the respective outer face into the respective one of the first and second end plates.

4. The flywheel assembly of claim 3, further comprising a pair of securing members, each of the pair of securing members secured to the outer face of a respective one of the first and second end plates,
wherein each of the pair of shafts is secured to a respective one of the pair of securing members.

5. The flywheel assembly of claim 2, wherein, for each of the first and second end plates, the volume of each of the respective holes is defined such that a center of mass of the flywheel assembly lies on the rotational axis extending through the pair of shafts.

6. The flywheel assembly of claim 1, wherein the rotation axis is a symmetry axis.

7. The flywheel assembly of claim 1, wherein, for each of the first and second end plates, each of the respective plurality of teeth do not extend past a circumference of each of the plurality of stacked plates.

8. The flywheel assembly of claim 1, wherein each of the plurality of stacked plates are circular, and
wherein the radii of the plurality of stacked plates are equal to each other.

9. The flywheel assembly of claim 1, further comprising a filler material, a respective predetermined amount of the filler material being deposited between each adjacent pair of the plurality of stacked plates.

10. The flywheel assembly of claim 9, wherein each respective predetermined amount of the filler material is defined such that the respective pair of adjacent plates are parallel to each other.

11. The flywheel assembly of claim 9, wherein the filler material is an adhesive material.

12. The flywheel assembly of claim 1, further comprising a plurality of rods,
- wherein the rotor comprises a plurality of channels, each channel extending through the plurality of stacked plates from the first end of the rotor to the second end of the rotor, and
- wherein each of the plurality of rods is inserted within a respective one of the plurality of channels.

13. A method for manufacturing a flywheel assembly, the method comprising:
- for each of a plurality of stacks of plates, applying a respective predetermined amount of adhesive filler material between each pair of adjacent plates;
- for each of the plurality of stacks of plates, securing the respective stack of plates between two parallel reference plates;
- stacking the plurality of stacks of plates to define a rotor;
- securing the stacked stacks of plates to each other; and
- securing each of a pair of shafts to a respective end of the rotor,
- wherein the method further comprises:
- after solidification of the filler material, creating a plurality of channels in each of the plurality of stacks of plates; and
- inserting a plurality of rods through the created channels of the plurality of stacks of plates, the securing the stacked stacks of plates to each other being responsive to the inserted rods.

14. A method for manufacturing a flywheel assembly, the method comprising:
- for each of a plurality of stacks of plates, applying a respective predetermined amount of adhesive filler material between each pair of adjacent plates;
- for each of the plurality of stacks of plates, securing the respective stack of plates between two parallel reference plates;
- stacking the plurality of stacks of plates to define a rotor;
- securing the stacked stacks of plates to each other; and
- securing each of a pair of shafts to a respective end of the rotor,
- wherein the plurality of stacks of plates comprises a first stack of end plates, a second stack of end plates and a plurality of stacks of intermediate plates stacked between the first and second stacks of end plates,
- wherein each of the first stack of end plates comprises a plurality of teeth in a perimeter thereof, each tooth of each plate of the first stack of end plates aligned with a respective tooth of each of the remainder of plates of the first stack of end plates,
- wherein each of the second stack of end plates comprises a plurality of teeth in a perimeter thereof, each tooth of each plate of the second stack of end plates aligned with a respective tooth of each of the remainder of plates of the second stack of end plates,
- wherein each tooth of at least one of the first stack of end plates comprises a respective hole therein and each tooth of at least one of the second stack of end plates comprises a respective hole therein, and
- wherein the method further comprises:
- determining a position of a center of mass of the flywheel assembly; and
- responsive to the determined position, expanding one or more of the plurality of holes such that the center of mass of the flywheel assembly lies on a rotational axis extending through the pair of shafts.

* * * * *